United States Patent [19]

Sczechowski et al.

[11] Patent Number: 5,439,652
[45] Date of Patent: Aug. 8, 1995

[54] USE OF CONTROLLED PERIODIC ILLUMINATION FOR AN IMPROVED METHOD OF PHOTOCATALYSIS AND AN IMPROVED REACTOR DESIGN

[75] Inventors: Jeffrey G. Sczechowski, Longmont; Carl A. Koval, Golden; Richard D. Noble, Boulder, all of Colo.

[73] Assignee: The Regents of the University of Colorado, Boulder, Colo.

[21] Appl. No.: 129,849

[22] Filed: Sep. 30, 1993

[51] Int. Cl.6 .............................................. B01J 19/12
[52] U.S. Cl. ................................ 422/186.3; 422/900; 422/186; 588/900
[58] Field of Search ................. 422/186.3, 186, 900; 588/900, 205

[56] References Cited

U.S. PATENT DOCUMENTS

| | | |
|---|---|---|
| 3,067,115 | 12/1962 | Clingman, Jr. .................. 204/154 |
| 3,875,067 | 4/1975 | DeSorgo et al. ................. 250/527 |
| 4,005,135 | 1/1977 | Helding ............................ 250/527 |
| 4,010,374 | 3/1977 | Ramler ........................ 250/492 R |
| 4,276,479 | 6/1981 | Mibu et al. .................. 250/492 R |
| 4,450,139 | 5/1984 | Bussiere et al. ............... 422/186.3 |
| 4,571,290 | 2/1986 | Ward et al. .................. 204/157.69 |
| 4,655,891 | 4/1987 | Ward et al. ................. 204/157.93 |
| 4,861,484 | 8/1989 | Lichtin et al. ................... 210/638 |
| 4,954,320 | 9/1990 | Birmingham et al. ........ 422/186.04 |
| 4,959,142 | 9/1990 | Dempo .............................. 210/167 |
| 4,963,750 | 10/1990 | Wilson .............................. 250/436 |
| 4,966,759 | 10/1990 | Robertson et al. ................. 422/186 |
| 4,976,930 | 12/1990 | Kishida et al. ................ 422/186.3 |
| 5,116,582 | 5/1992 | Cooper et al. ................. 422/186.3 |
| 5,174,877 | 12/1992 | Cooper et al. .................... 204/193 |

Primary Examiner—Donald P. Walsh
Assistant Examiner—Daniel Jenkins
Attorney, Agent, or Firm—Swanson & Bratschun

[57] ABSTRACT

An improved photocatalytic method for removing organic contaminants from fluid or gas phases and a photoreactor design which allows exposure of photoreactive material to controlled periodic illumination. An improved method for improving the photoefficiency of a photocatalytic process comprising continuous illumination of the photocatalyst at a decreased light intensity.

42 Claims, 7 Drawing Sheets

USE OF CONTROLLED PERIODIC ILLUMINATION FOR AN IMPROVED METHOD OF PHOTOCATALYSIS AND AN IMPROVED REACTOR DESIGN

FIELD OF THE INVENTION

The present invention relates to photocatalysis. Specifically, the invention relates to a method for controlling periodic illumination of a photocatalyst, resulting in improved photon efficiency. The present invention also includes an improved photoreactor design which allows controlled periodic illumination of a photocatalyst. The method of the present invention further allows the calculation of the specific light intensity required to increase photoefficiency under conditions of continuous illumination. The present invention is useful in the removal of organic contaminants from liquid phases, including aqueous and organic liquids, gas phases, and in the purification of industrial waste waters.

BACKGROUND OF THE INVENTION

Current approaches to the removal of organic contaminants in aqueous streams include the use of adsorptive filters, chemical-UV initiated oxidation, ozone treatment and heterogeneous photocatalysis. Heterogeneous photocatalysis employs photopromoted catalytic degradation of organic material in aqueous solutions and organic solvents. Oxygen is often used as the oxidizing agent in combination with a solid catalyst, such as a semi-conductor transition metal oxide in powder form. Heterogeneous photocatalysis involves the continuous illumination of a photoexcitable solid catalyst to degrade reactants adsorbed on the photocatalyst surface (Ollis et al. (1991a) Environ. Sci. Technol. 25:1523). Laboratory studies demonstrate that a wide range of organic compounds decompose into carbon dioxide and mineral acids when semiconductor powders are added to aqueous wastes and illuminated with long wave ultraviolet (UV) photons (Ollis et al. (1991b) in: *Photocatalysis: Fundamentals and Applications* (Serpone & Pelizzetti, eds.), John Wiley & Sons, New York, pp. 603–637; Pelizzetti et al. (1988) in: *Photocatalysis and Environment* (Schiavello, ed.), Kluwer Academic Publishers, Dordrecht, pp. 469–497). Unfortunately, low quantum yields limit the possibilities for economical scale up in industrial applications (Ollis et al. (1991a) supra).

The photoefficiency of photosynthesis is known to be decreased due to the saturation phenomena of photobleaching of the photosynthetic pigments. Periodic illumination has been studied in the photo-driven process of photosynthesis to increase photoefficiency (Kok (1956) Biochim. Biophys. Acta 21:245; Laws et al. (1983) Biotech. Bioeng. 25:2319). Semi-conductor based photoconversion devices are not expected to "bleach" or saturate because charge separation occurs by electronic conduction in semi-conductors, as opposed to the movement of electrons in the photosynthetic process. The Applicants' work is the first evidence that controlled periodic illumination increases the photoefficiency of semi-conductor photoconversion.

The prior art describes the use of photocatalytic methods for the degradation of contaminating organic materials in aqueous or organic solutions. For example, Lichtin et al. (U.S. Pat. No. 4,861,484), entitled: *Catalytic Process For Degradation of Organic Materials in Aqueous and Organic Fluids to Produce Environmentally Compatible Products*, describes the use of a variety of solid transition metal catalysts, including titanium dioxide, in conjunction with hydrogen peroxide to photochemically degrade a wide variety of organic materials into carbon dioxide and other environmentally compatible compounds. Lichtin examines reaction products after illumination times of 1 to 6 hours. Lichtin does not disclose or suggest varying dark recovery times or the use of controlled intermittent illumination/dark recovery periods. Al-Ekabi et al. (U.S. Pat. No. 5,126,111), entitled: *Fluid Purification,* is directed to improving the quantum yield of $TiO_2$ photocatalytic degradation of organics by inhibiting the electron/hole pair recombination process. This is accomplished by adding specific electron acceptors to the solution mixture to promote the formation of radical species, which enhances the oxidation of the organic compounds and thereby increases the quantum yield of the photocatalytic process. In contrast to the Al-Ekabi patent, the present invention does not require the addition of specific electron acceptors, but uses controlled periodic illumination to generate electron/hole pairs which create oxidizing species which can react during the dark recovery period.

Kitamori et al. (U.S. Pat. No. 4,774,026), entitled: *Process and Apparatus for Oxidizing or Reducing Dissolved Substance,* in a similar manner to Al-Ekabi, Kitamori describes a method of improving the efficiency of photocatalysis by the addition of a water soluble electron acceptor. Kitamori does not disclose or suggest varying illumination or dark recovery periods or the use of periodic cycles of illumination/darkness. Raupp (1992)(First International Conference on $TiO_2$ Photocatalytic Purification and Treatment of Water and Air, abstract, pg. 73) suggests that regeneration of deactivated catalysts may be achieved by flowing humid air over the catalyst bed for brief time periods in the absence of UV illumination, or by allowing the catalyst to rest in the dark for longer periods of time without gas flow. Raupp does not suggest the use of controlled periodic illumination of photocatalytic material nor the use of periodic illumination as a method of improving photoefficiency.

BRIEF SUMMARY OF THE INVENTION

Herein disclosed is a method for improving the photoefficiency of oxidative photocatalytic processes. The present invention is based on the discovery that the controlled periodic illumination of a photocatalyst increases the efficiency of the photooxidative reaction.

In a non-limiting illustrative example of the present invention, the present inventors establish that the photoefficiency of the photocatalytic decomposition of a common organic contaminant increases significantly with controlled periodic illumination. The use of pulsed light holds significant promise for improving the photoefficiencies attainable for a variety of other photocatalytic systems. The present invention encompasses the use of a variety of photoreactive materials, including semiconductor materials such as titanium dioxide ($TiO_2$). The higher photoefficiencies translate directly into more economical reactors with higher output, making photocatalysis a more competitive advanced oxidation process.

The inventors' discovery of improved photoefficiency with controlled periodic illumination allows calculation of the optimal number of photons which can be utilized by the photocatalyst in a specific period of time without saturating the photocatalyst. Application of this discovery allows the determination of the number of photons that may be delivered to the photocatalyst under conditions of continuous illumination without saturating the photocatalyst, and therefore, the determination of a specific light intensity required to improve photoefficiency. Therefore, the present invention further includes the use of continuous illumination at a specific light intensity calculated according to the method of the present invention to increase the photoefficiency of a photocatalytic reaction.

The present invention encompasses photoreactor designs which allow controlled periodic illumination of a photocatalyst. This encompasses reactor designs in which the source of illumination moves, as well as designs where the photoreactive material moves past a fixed light source. One embodiment of the photoreactor design of the present invention is the channel photoreactor of FIG. 1.

The improved photocatalytic method and apparatus of the present invention is suitable for removing organic contaminants in a liquid or gas phase. The liquid phase may be aqueous or organic. The examples disclosed herein are non-limiting and illustrative of the method and apparatus of the present invention. Other uses of the invention will be apparent to one skilled in the art from the disclosure.

DETAILED DESCRIPTION OF THE PREFERRED EMBODIMENTS

The present invention includes a method for operating an aqueous slurry photoreactor with improved photoefficiencies. The improved photoefficiencies result from the controlled periodic illumination of the photocatalytic material. The alternating exposure of the photocatalytic material to periods of illumination and darkness may be optimized to maximize photoefficiency. This improves the commercial possibilities of photocatalysis.

Current scientific theory holds that illumination of photoreactive materials particles, for example $TiO_2$ particles, results in the formation of electron/hole pairs. Ideally, these species participate in redox reactions involving the organic molecule of interest and molecular oxygen resulting in the production of $CO_2$ and $H_2O$ (photocatalysis). Since reactions of electrons and holes are necessarily single electron processes while the overall photocatalytic process is multi-electron, a variety of intermediate species are postulated to exist in the overall mechanism. Examples of such intermediate species may include hydroxyl radical, superoxide ion, and a variety of organic radicals which would depend on the nature of the molecule(s) undergoing photocatalytic oxidation (Gerischer & Heller (1991) J. Phys. Chem. 95:5261). While these photogenerated intermediates may be involved in the photocatalytic oxidation of organics, they may also participate in reactions that result in the recombination of electron/hole pairs or other redox processes that do not oxidize the organic material present. The buildup of these intermediates due to continuous illumination of the particles will favor these undesirable reactions. This results in a diminished efficiency for the conversion of electron/hole pairs in the photocatalytic oxidation process.

Although not bound by any theory, it appears that controlled periodic illumination reduces the buildup of intermediates and increases the photoefficiency of the process. Illuminating the particles for short intervals generates a limited number of electron/hole pairs. When the particles are in the dark, the redox reactions leading to oxidation of the organics takes place. After most of the intermediates are consumed, the particles can be illuminated again for another short period. This light-dark cycling reduces the buildup of intermediates and reduces the rate of undesirable reactions.

Conventional slurry photoreactors usually contain light and dark regions because the solution depth exceeds the light penetration depth. The particles in the solution are transported between these regions by turbulent flow. Such reactors are not suitable to test the above hypothesis because the times spent by the particles in the light and dark regions of the reactor are random. In order to provide a reactor which exposes photoreactive particles to controlled periodic illumination, a novel channel photoreactor was designed with laminar flow that allows portions of a photocatalyst slurry to undergo periodic illumination in a controlled manner.

The present invention encompasses photoreactor designs which allow the exposure of photoreactive material to controlled periodic illumination. The present invention further encompasses reactor designs in which photoreactive material moves past fixed light source(s), as well as reactor designs whereby light source(s) move past immobilized photoreactive material. In one embodiment of the photoreactor of the present invention, a channel photoreactor contains an aqueous slurry of photocatalytic material which is alternatively exposed to periods of illumination and darkness by moving past a light source.

The improved light utilization of the present invention is achieved by optimizing both light and dark recovery times. The present invention shows that photoefficiencies increase with decreasing illumination times and that, for a given illumination time, there is a critical dark time required to achieve the maximum photoefficiency. "Photoefficiency" may be described as the rate of a photochemical process divided by the number of photons entering the reactor or striking the free surface of the slurry in the reactor. One measure of the efficient use of light is the quantum yield. In Examples 1 and 2, photoefficency (PE) is defined as:

$$PE = \frac{\text{moles of organic molecule reacted}}{\text{moles of photons entering the reactor}} \times 100\%$$

wherein the organic molecule reacted is formate.

The method of the present invention encompasses the controlled exposure of any photoreactive material to periodic illumination. The method of the present invention further includes the controlled exposure of a photoreactive material to the periodic illumination of light of any wavelength, including but not limited to visible, UV, and infrared light. In a preferred embodiment of the present invention, the photocatalytic material is an aqueous slurry of a semiconductor powder such as $TiO_2$, exposed to UV radiation. Other examples of photoreactive material include, but are not limited to, tungsten oxide ($WO_3$) and strontium titanium oxide ($SrTiO_3$).

Formate is a common component in aqueous waste effluent from electroless plating baths. In Example 1, the basic experimental conditions and analytical methods used are described. In Example 2, the photoefficiency achieved during the photocatalytic oxidation of formate by $TiO_2$ is investigated by exposing two formate solutions to varying periods of UV illumination and darkness (50 ppm and 4000 ppm). Additional experiments conducted with variable light intensities are described in Example 4.

Figure 1:
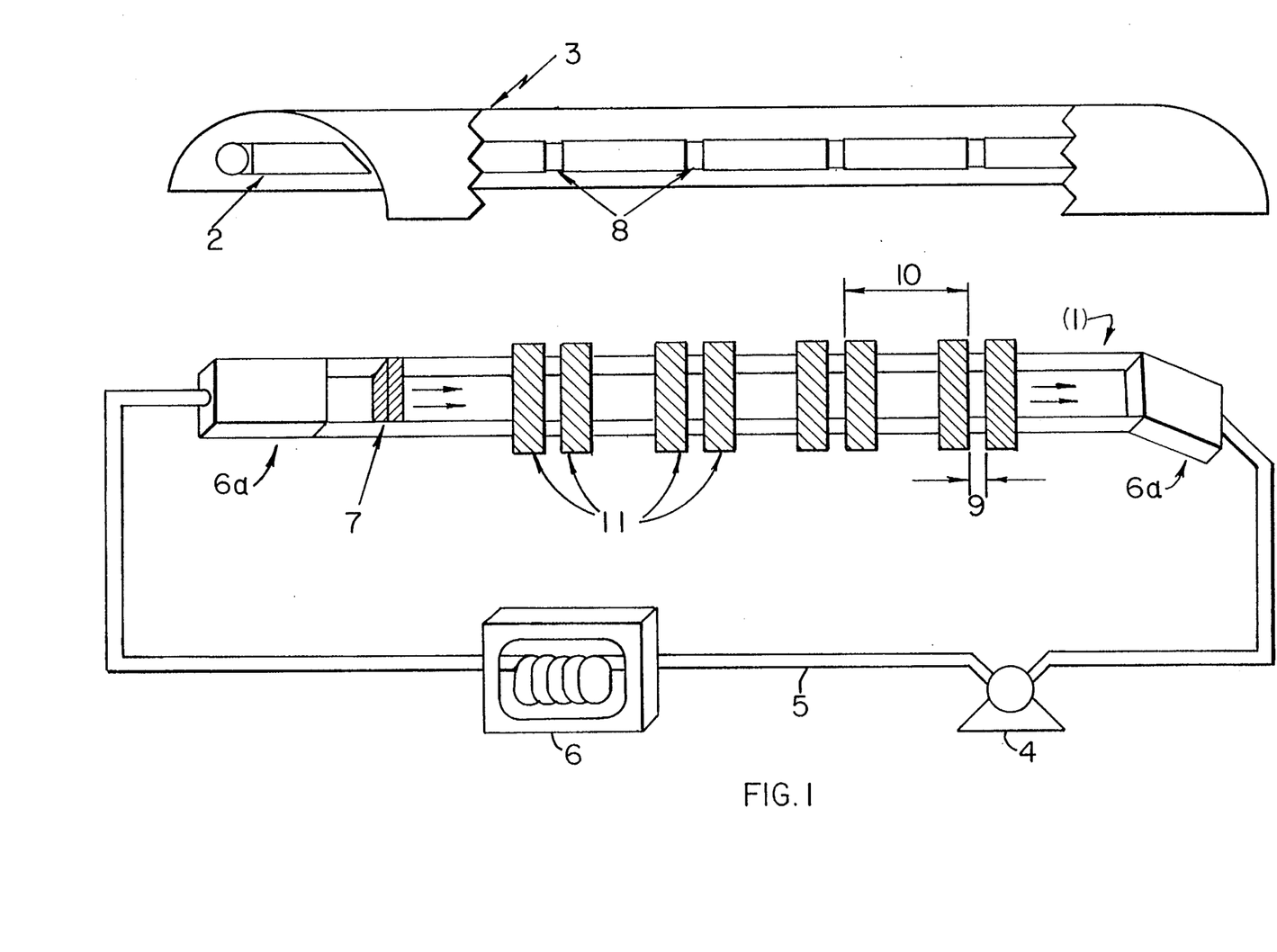
FIG. 1 is a schematic drawing of the channel photoreactor of the present invention.

One embodiment of the photoreactor of the present invention is shown in FIG. 1. The illuminated portion of the reactor consists of a 132 cm×6.7 cm rectangular aluminum channel (1) 1 cm in depth with a fluid depth of 0.6 cm. The illumination source is a 40 watt black light (2) (General Electric) equipped with a parabolic aluminum reflector (3). A Peristaltic pump (4) (Cole Palmer Scientific) circulates the slurry through Nalgene plastic tubing (5). Approximately 40 cm of the tubing is coiled and placed in a 115 watt ultrasonic bath (6) (Cole Palmer Scientific). The ultrasonic energy that the fluid receives as it passes through the bath is sufficient to reduce particle flocculation and subsequent deposition of particles at the channel bottom. Fluid distributors (6a) and collectors were machined from solid blocks of PVC. A small sluice gate (7) at the head of the reactor channel reduces pulsations from the pump. The total system volume is 750 ml. Different illumination and dark times were created by covering a majority of the bulb with aluminum foil leaving small exposure spaces (8). The length of the spacing (9 and 10) corresponds to the light and dark exposure times as the fluid passes underneath the illumination. Aluminum plates (11) separated by the same exposure length and placed over the channel blocked any reflected light from entering the reactor other than through the desired spacing.

Figure 2:
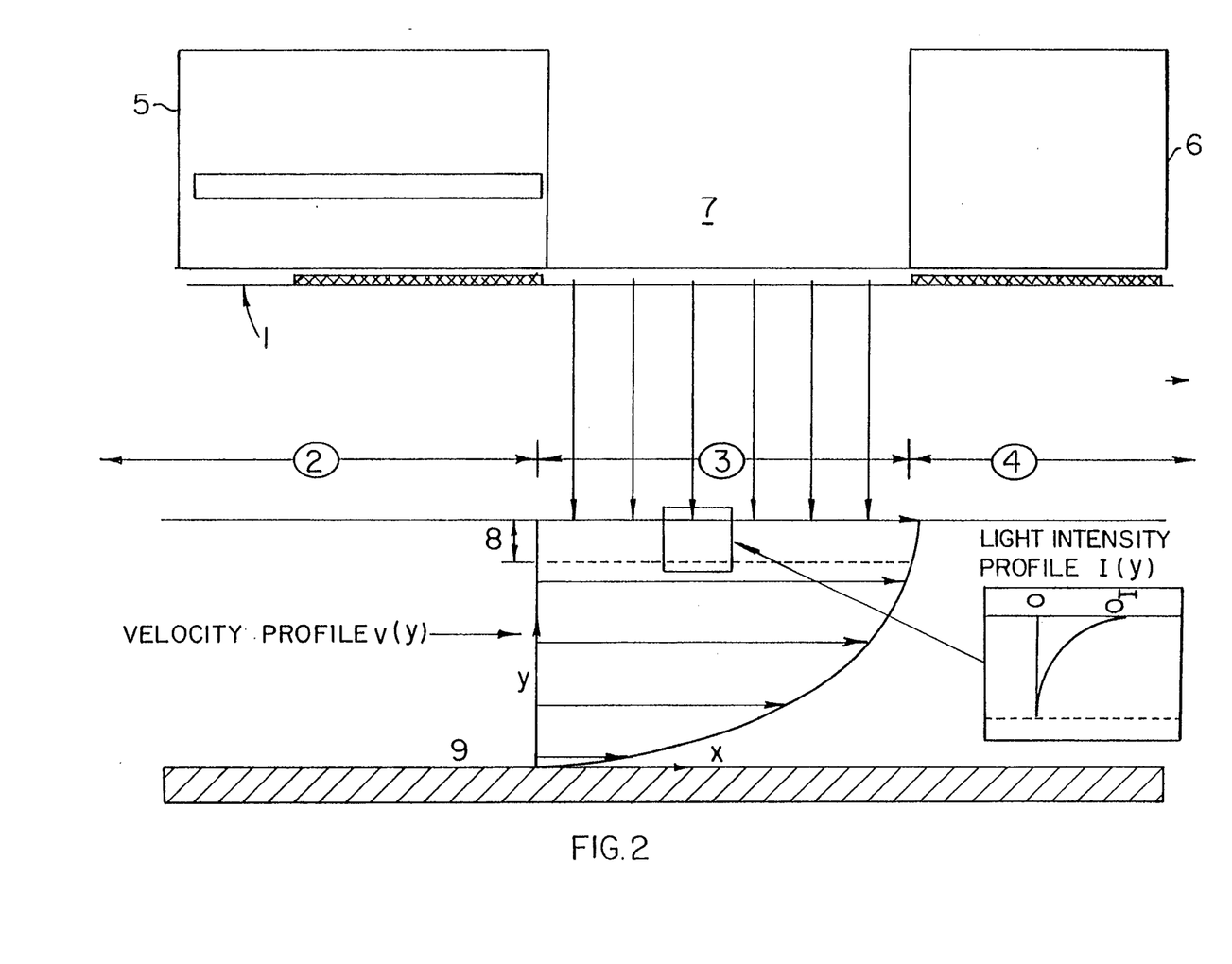
FIG. 2 illustrates the laminar velocity profile and the light intensity profile in the channel of the reactor.

FIG. 2 illustrates the laminar velocity and light intensity profiles in the channel of the reactor design of the present invention. Liquid flows in the open channel (1) of the photoreactor from left to right. The liquid is exposed to dark periods (2 and 4) as the liquid moves past covered areas of the UV bulb (5 and 6) and light periods (3) as the liquid moves past exposed areas of the UV bulb (7). Light penetrates the liquid to a depth of 1 mm (8). The velocity profile of the liquid as it moves in the channel is shown, as is the light intensity profile.

EXPERIMENT 1

Experimental Procedures

In the channel photoreactor shown in FIG. 1, an average linear surface flow rate of 13.8 cm/sec was determined by sprinkling small amounts of $TiO_2$ powder on the free surface and timing how long it took the particles to travel a specified distance. The volumetric flow rate was 42 ml/sec. The flow was laminar with a calculated Reynolds number of approximately 1800. This was confirmed visually by the lack of turbulent eddies. Only the center 80 cm of the reactor was illuminated to reduce hydrodynamic entrance effects and intensity variances at the ends of the black light bulb. The residence time in the recirculating tubing was 5 seconds. This was determined by injecting organic food dyes at the exit of the channel and recording the time required for the dye to reappear at the entrance of the channel.

Differential illumination and dark times were created by covering a majority of the bulb with aluminum foil except for small exposed sections. The length of the exposed section corresponds to an exposure time as the fluid passed underneath the exposed bulb. Aluminum plates separated by the same exposure length and placed over the channel blocked any reflected light from entering the reactor other than through the desired spacing.

If there were several illumination lengths, the laminar flow in the reactor channel ensured the same catalyst particles were illuminated each time. Even with laminar flow, the slurry systems of the present invention are free from mass transfer limitations because of the small size of the individual catalyst particles (Pruden, A. L. (1981) Ph.D. Thesis, Princeton University, N.J.; Ollis (1991) in: *Photochemical Conversion and Storage of Solar Energy* (Pelizzetti & Serpone, eds.), Kluwer Academic Publishers, Dordrecht, pp. 593-622). The high weight loading of catalyst attenuated 99% of the incident light in the top 1 mm of the slurry. This was determined by a light penetration depth experiment with a UV radiometer sensor and a flowing transmission cell with a 3 mm path length. In this experiment the UV bulb was placed on one side of the cell and the radiometer on the other. First, distilled water was circulated through the cell, then small amounts of sonicated $TiO_2$ were added to the solution, increasing the $TiO_2$ concentration. A Beer's law type expression was found for the transmitted light as a function of the TiO$_2$ loading. From this relationship, the calculated light penetration depth for the 0.4% (by weight) Degussa TiO$_2$ slurry used in these experiments was approximately 1 mm.

FIG. 2 illustrates the laminar velocity and light intensity profiles in the channel of the reactor design of the present invention. This flowing system makes it easy to control the illumination and recovery times for a packet of particles moving along the surface. The illuminated particles were in the top 1 mm of fluid where there was little change in the velocity. A fluid packet of illuminated particles remains virtually intact during the entire time it remains in the channel because of the laminar flow. Thus, the same particles are illuminated multiple times in the channel. The first portion of the channel is dark with respect to the UV light (2). The fluid packet then passes underneath the exposed section of the bulb (3) and is illuminated for a period, $t_{light}$. Exiting this illuminated portion, the packet returns to the dark (4) for a period, $t_{dark}$, until it reaches the next illuminated section of the channel. Light and dark reactions times, $t_{light}$ and $t_{dark}$, were calculated for the particles in the channel using the measured surface velocity.

A 365 nm UV radiometer (UVP Inc., model UVX) measured the light intensity from the light source for each experiment; these readings were used to calculate the incident photon rates. Potassium ferrioxylate actinometry experiments calibrated the radiometer readings (Hatchard et al. (1956) Proc. R. Soc. London Ser. A. 235:518). Photoefficiencies ($\Phi$) were calculated as the ratio of the formate reaction rates to the incident photon rates ($\times 100\%$). This value is sometimes referred to as the quantum yield, however photoefficiency is a more accurate term because of the light scattering caused by the small particles. The term photoefficiency only takes into account the photons entering the reactor, whereas "quantum yield" is calculated from the number of photons absorbed by the solution. Light scattering due to the heterogeneity of the slurry makes it extremely difficult to determine the number of photons that are actually absorbed by the TiO$_2$ particles. The actinometry experiments, performed with no TiO$_2$ in the reactor, cannot account for the back scattering of light as it strikes the surface of a slurry. These back scattering losses have been estimated to be as high as 20% (Turchi, C. S. (1990) Ph.D. Thesis, North Carolina State University, Raleigh, N.C.). Correction for back scattering losses would increase the reported photoefficiencies.

The temperature remained constant during the course of the experiments at 30±2° C. since the ultrasonic bath and pump acted as constant heat sources during the experiments. The experiments lasted from 1 to 3 hours. During this time, there was no measurable contamination of, or evaporation from, the system. Also, during this time less than 10% of the formate ion was photodecomposed, i.e., the photocatalytic process proceeded at its initial rate. Initial rate experiments eliminate the effect of concentration changes of the reactant and any inhibitory effects of product formation. The pH of the unbuffered solution remained between 6–7 during these initial rate experiments.

Analytical Procedures

An O.I. Analytical Total Organic Carbon (TOC) Analyzer determined the concentration of the reactant formate anion in 1 ml sample aliquots. Any CO$_2$ formed during the experiment was removed by precipitation with a saturated calcium hydroxide solution so it would not interfere with the TOC analysis. The samples were then filtered with a 0.2 $\mu$m Supor syringe filter (Gelman) before injection into the TOC analyzer. Aqueous potassium hydrogen phthalate solutions served as TOC standards for calibrating the instrument. To verify the TOC analyses, a gas sensing CO$_2$ electrode inserted in 10 ml sample aliquots determined the concentration of the CO$_2$ formed as the reaction proceeded. Sodium bicarbonate solutions served as calibration standards for the electrode over a concentration range of $10^{-5}$ to $10^{-2}$M CO$_2$.

EXAMPLE 2

Photocatalyzed Decomposition of Formate

The photocatalytic oxidation of formate ion, a common component in aqueous waste effluent from electroless plating baths, was performed with the channel photoreactor of FIG. 1 containing aqueous slurries of TiO$_2$. Photoefficiencies for the photocatalytic oxidation of formate ion were determined under a variety of illumination and dark recovery exposures.

Figure 3:
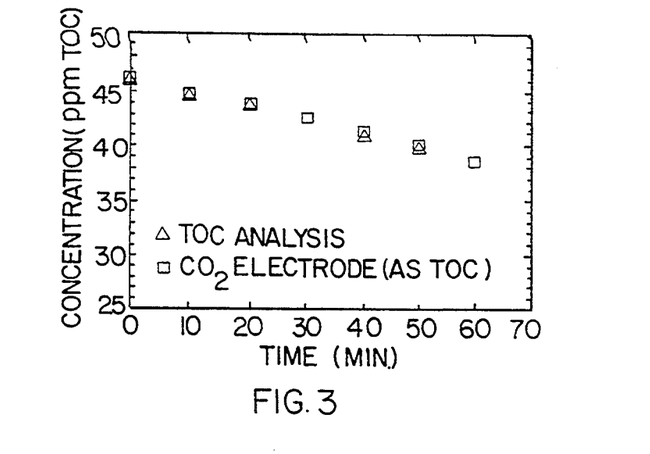
FIG. 3 shows formate concentration as a function of time for an initial rate experiment.

The first set of experiments conducted determined the dark recovery time ($t_{dark}$). The initial experiment had a dark time equal to zero, since the entire length of the channel was illuminated. There was an unavoidable 5 second dark time due to the recirculating loop. With the entire length illuminated, the particles were exposed to the light for 5.6 seconds. After introducing small dark times in the channel, the photoefficiency increased (FIG. 3). For the 50 ppm TOC runs, the photoefficiency leveled off with dark times of greater than 1 second. The photoefficiency in the 4000 ppm TOC runs continued to increase slightly even with the dark time of 5.6 seconds, the maximum value with this channel design.

Figure 4:
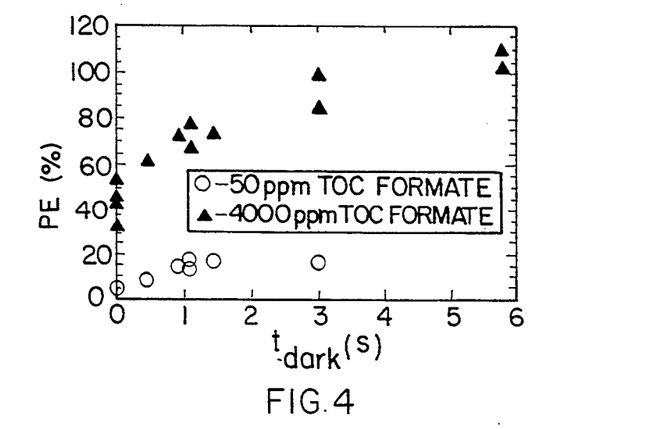
FIG. 4 shows the photoefficiency (PE) as a function of dark time ($t_{dark}$) when light time ($t_{light}$) is 0.15 seconds and I (UV light intensity) is 1.6 mW/cm$^2$ for two concentrations of formate (50 ppm and 4000 ppm).

The next set of experiments determined exactly how much light time ($t_{light}$) affected the photoefficiency. In these experiments, the light exposures were separated by the appropriate optimal dark times at both concentrations. FIG. 4 shows how shorter illumination times produced higher photoefficiencies at both concentrations. With light times of 72 ms and the appropriate dark times, the photoefficiency increased 500% over the base case of continuous illumination for the 50 ppm TOC runs. The 4000 ppm TOC experiments showed a 300% increase in the photoefficiency.

The reaction for the photocatalytic decomposition of formate ion is:

$$2\ COOH^- + O_2 \xrightarrow{\frac{h\nu\ (UV)}{TiO_2}} 2\ CO_2 + 2\ OH^-$$

Figure 5:
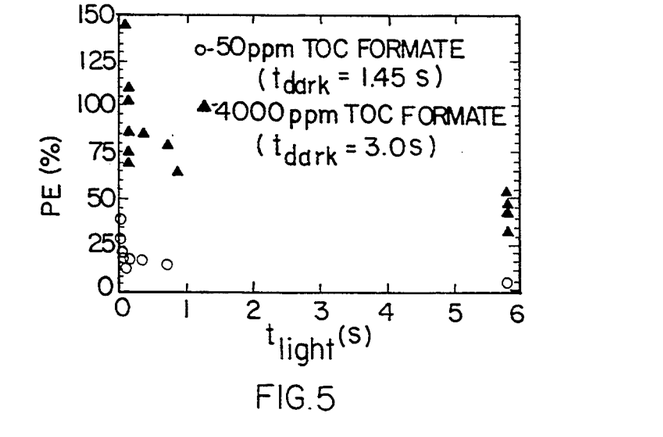
FIG. 5 shows the relationship between photoefficiency and $t_{light}$ for two solutions of formate (50 ppm and 4000 ppm ) (I=1.6 mW / cm$^2$).

Accordingly, there was a one-to-one correspondence between the moles of formate consumed and CO$_2$ evolved as measured by the TOC analyzer and the CO$_2$ electrode, respectively. The one to one correspondence between the moles of formate consumed to the moles of CO$_2$ produced is shown in FIG. 5. This figure shows that the rates of reaction calculated by the two analytical methods were equal.

Results for oxidation of a 50 ppm formate solution in the channel photoreactor of the present invention are shown in Table I. The reaction solution consisted of 3 grams of TiO$_2$ (Degussa) added to 744 ml of distilled water. Placing the mixture in an ultrasonic bath for 15 minutes thoroughly dispersed the catalyst particles. After pouring the slurry into the reactor, 6 ml of a concentrated sodium formate solution was added such that the initial concentration in the reaction mixture was 50 ppm of total organic carbon (TOC).

Table I lists reaction conditions, rates of product formation, and photoefficiencies for the photocatalytic destruction of formate ion. The length illuminated or dark is expressed as the number of exposures times the width of the exposure in centimeters. All Runs in Table I contain a dark time of 5 seconds as particles are recirculated. Note that Runs 5 and 10 are the same experiment listed twice to show the trend of increasing quantum yield.

In Run 1, the center 80 cm of the channel was illuminated. In Runs 2-6, evenly spaced 2 cm segments of the channel were illuminated. In Runs 7-11, the illumination lengths varied from 20 to 1 cm.

Table I also lists the measured average intensity of light entering the channel through the illuminated lengths. The average intensity decreased slightly with decreasing illumination length. The axial illumination contributions were reduced when the spacing between the aluminum plates was small.

The full 80 cm exposure in Run 1 provided a basis for demonstrating increases in the photoefficiency. The value of 4% for Run 1 is similar to values reported for slurry reactors (Pruden & Ollis (1983a) J. Catal. 82:404; Pruden & Ollis (1983b) Environ. Sci. Technol. 17:628; Turch et al. (1992) National Renewable Energy Laboratory, TP-432-4865). Comparing the photoefficiency for Runs 1 and 2 also demonstrates that reducing the illumination time to <1 second and subsequently introducing a small dark recovery time results in a dramatic increase in $\Phi$. Runs 2-6 show how the photoefficiency increased as the dark time increased and how it levelled off when the dark time was greater than 1.4 seconds. The illumination time was then varied in Runs 7-11. Since reducing the illumination length reduced the area per each exposure, it was necessary to use several illumination lengths to establish a measurable rate. When employing a dark time of 1.44 seconds, the photoefficiency increased as the excitation time decreased (Runs 7-11). In Run 11, with an excitation time of 72 ms, the $\Phi$ is a factor of 5 greater than the base case with a single 80 cm exposure. An important comparison occurs between Runs 7 and 9 in which approximately the same number of photons entered the reactor channel. In Run 7, the exposed length was one 20 cm section. In Run 9, the illuminated area was the same; however, is was distributed among 4 spacings each of 5 cm in length, separated by the optimal recovery time of 1.44 seconds. The $\Phi$ for Run 9 is 33% larger than the $\Phi$ for Run 7.

Light penetration depth studies indicated that 99% of the photons were absorbed in the top 1 mm of fluid in the channel. For Run 5, this translates to each particle at the surface absorbing approximately 250 photons during the near optimal exposure time of 145 ms. The average number of photons absorbed by each particle in the 1 mm illuminated depth was approximately 50. It is interesting to compare these values to the number of hydroxyl groups associated with each $TiO_2$ particle. Calculations based on $TiO_2$ surface studies reveal that there are approximately 100 OH groups on a 30 nm Degussa particle (Boonstra & Mutsaers (1975) J. Phys. Chem. 79:1694; Muunera et al. (1979) J. Chem. Soc. Faraday Trans. I 75:736).

EXAMPLE 3
Photoreactor Designs

The improved photoreactor of the present invention is designed to allow controlled periodic illumination of a photocatalyst. Nonlimiting examples of photoreactor designs using the concept of controlled illumination are shown in FIGS. 6-11.

Figure 6:
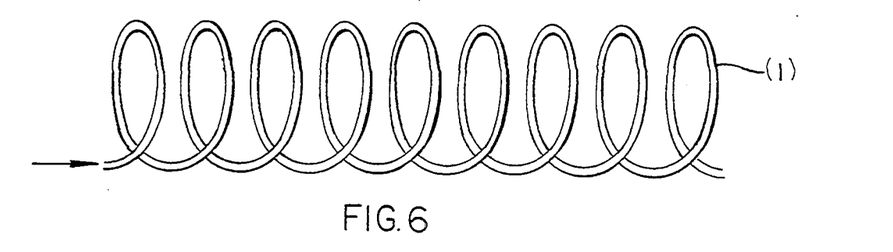
FIG. 6 illustrates a spiral helical tube photoreactor in which light and dark times are controlled by the amount of arc illuminated during one revolution.

In one embodiment of the photoreactor of the present invention shown in FIG. 6, the photocatalyst and organic reactants are contained in a liquid phase which flows in the direction shown by the arrow through a spiral helical tube (1). The walls of the tube are transparent to illumination from the light source. Light time is controlled by the amount of arc that is illuminated during one revolution of the flow in the reactor. The remainder of the time that the fluid spends in one revolution would be dark. The absolute values of the light and dark times may be controlled by the flow rate of the liquid phase in the reactor and/or the diameter of the reactor.

Figure 7:
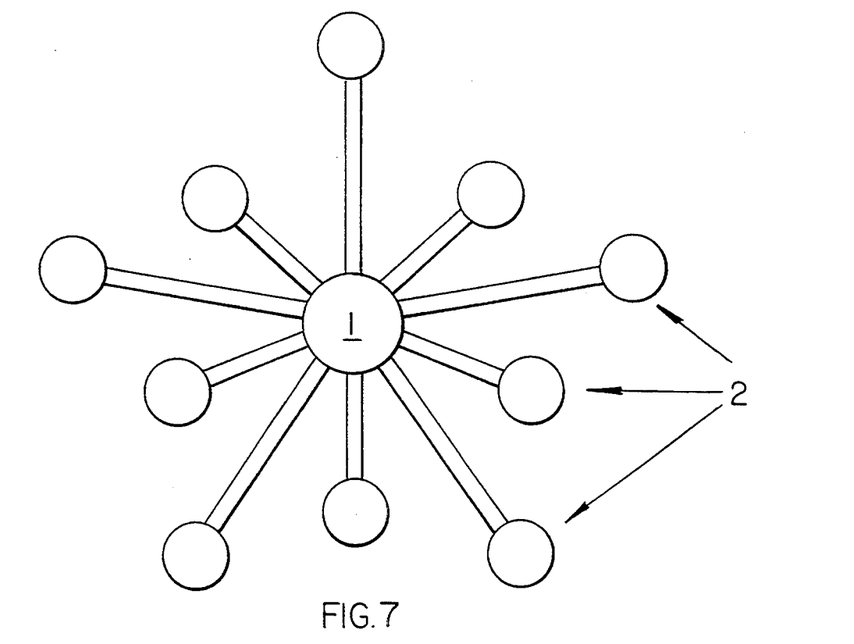
FIG. 7 illustrates use of one light source to continuously illuminate several photoreactors, thereby increasing the capacity of the system and efficiency of light utilization.

FIG. 7 shows a further embodiment of the photoreactor wherein a single light source (1) is used to continuously illuminate several photoreactors (2). This type of illumination design dramatically increases the capacity of the system and the efficiency of light use. This embodiment may be used for either liquid or gas phase systems. Light intensity may be controlled by the power output of the light source and/or the distance between the light source and the reactor tube section which is illuminated.

A further variation of the photoreactor design is to coat the inner surface of the reactor tube with the photocatalytic material.

Figure 8:
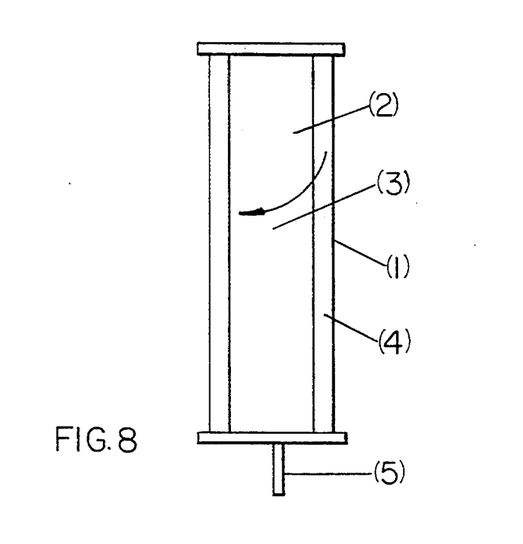
FIG. 8 shows a Taylor Vortex type of photoreactor in which controlled periodic illumination is achieved.
Figure 9:
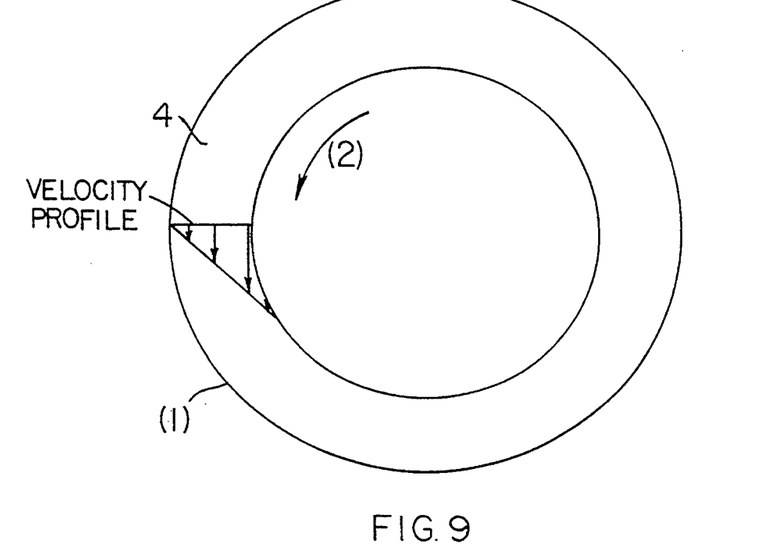
FIG. 9 illustrates the continuous velocity profile between the two cylinders in the Couette flow apparatus of the Taylor Vortex photoreactor.
Figure 10:
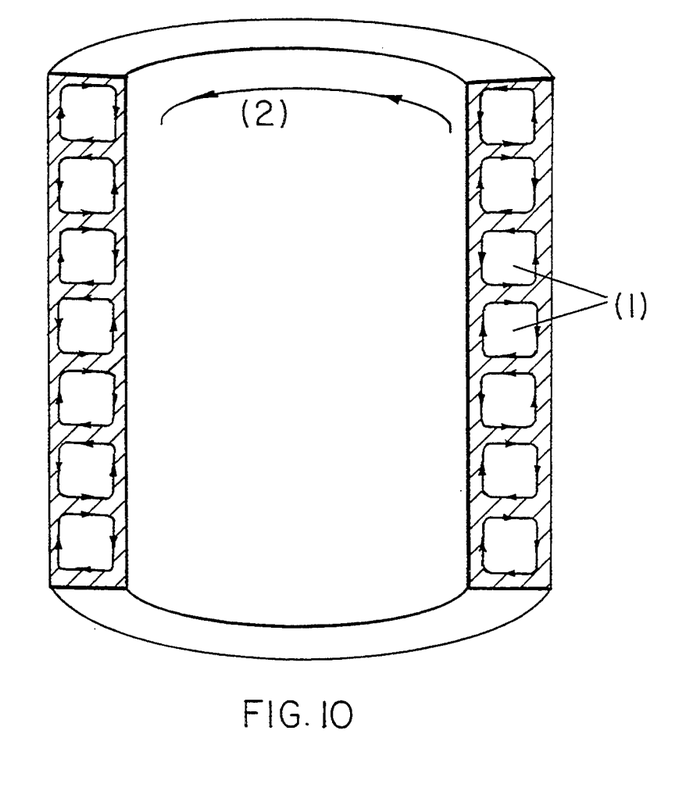
FIG. 10 is a cross-sectional view of the Couette flow device with Taylor vortices of the Taylor Vortex photoreactor.

FIG. 8 shows one embodiment of a photocatalytic reactor, a Taylor Vortex-type of reactor uses controlled periodic illumination to operate with a high photoefficiency. The reactor uses Couette flow to move the photocatalyst into and out of the illuminated portions of the reactor. A Couette flow apparatus consists of two concentric cylinders (1 and 2) with the inner cylinder (2) rotating relative to the outer cylinder (3). In the simplest embodiment, the outer cylinder remains fixed while the inner cylinder rotates. Light bulbs (3) can be placed inside the inner cylinder or the illumination source can be at the exterior of the outer cylinder in the form of bulbs or solar illumination. The photocatalytic slurry (4) is placed in the annular gap between the two cylinders. A no-slip boundary condition applies at both cylinder walls. A shaft (5) from the motor is used to rotate the inner cylinder. Thus, as the inner cylinder rotates, the fluid at the inner cylinder has an angular velocity equal to that of the inner cylinder. The fluid at the outer wall has no angular velocity since the outer cylinder is stationary. FIG. 9 shows the continuous velocity profile between the two cylinders. As the inner cylinder velocity increases, the centrifugal force acting on the fluid close to the inner cylinder increases. If rotated sufficiently fast, the centrifugal forces will overcome the stabilizing viscous forces of the fluid. At this point, a fluid instability develops in the form of series of counter-rotating vortex pairs (1) along the length of the annular gap as seen in FIG. 10. Since the light has a finite penetration depth, only a portion of each vortex close to the inner cylinder (2) is illuminated. Thus, the vortex flow moves the fluid into and out of the illumination in a controlled fashion. The circular rates inside these vortices are proportional to the rotation rate of the inner cylinder. Thus, through the rotation rate and the concentration of the catalyst (which will vary the depth of light penetration) the length of the light exposure and dark recovery time periods can be controlled.

Figure 11:
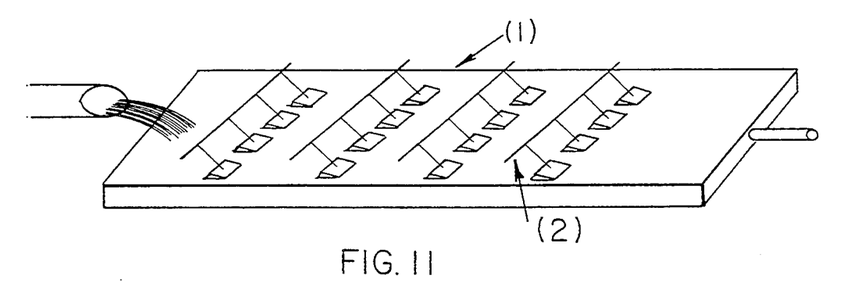
FIG. 11 illustrates the photocatalytic slurry flow in a photoreactor which uses a static mixer to produce light and dark time periods in the reactant slurry.
Figure 12:
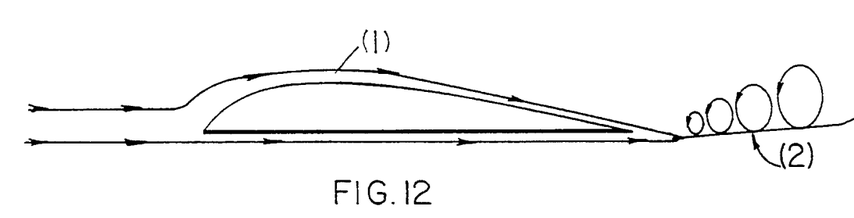
FIG. 12 illustrates vortex generation by the use of hydrodynamic foils placed in the flowing liquid slurry.
Figure 13:
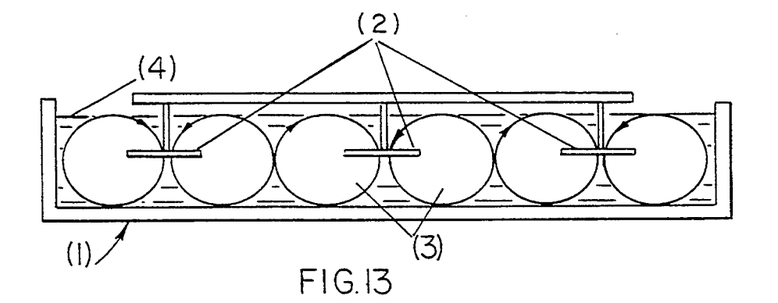
FIG. 13 illustrates the use of hydrodynamic foils to create a series of counter rotating vortices. An end view of the reactor shows the vortices generated after fluid passes over the foils.

In another embodiment of the photoreactor of the present invention, a static mixer is used to produce light and dark periods in the reactant slurry. FIG. 11 shows a simple channel trough (1) in which the slurry flows. Rows of hydrodynamic foils (2) are placed perpendicular to the axis of flow. FIG. 12 shows the hydrodynamic foils (1) placed in the flowing liquid to generate a rotating vortex (2). As the fluid passes over and under the foil, the pressure is lower on the upper side of the foil relative to the lower side of the foil due to Bernoulli's principle. When the upper and lower streams recombine at the end of the foil, the pressure gradient creates a vortex. When properly placed in the channel (1), several foils (2) may be used to create a series of counter rotating vortices (3) below the water level (4) (FIG. 13). The rotating speed of the vortex is controlled by the flow rate of the slurry, the size, shape, and spacing of the foils, and the angle at which the foil is positioned. This embodiment is an example of a passive type of reactor that does not use any moving parts to generate periodic illumination and is suitable for solar applications.

The photoefficiency of formate decomposition increased as light intensity decreased, demonstrating that as the number of photons striking a particular particle decreases, the efficiency of converting light energy into useful chemical energy increases.

A further experiment was conducted to determine if lowering the light intensity during continuous illumination results in an increase in photoefficiency.

Figure 15:
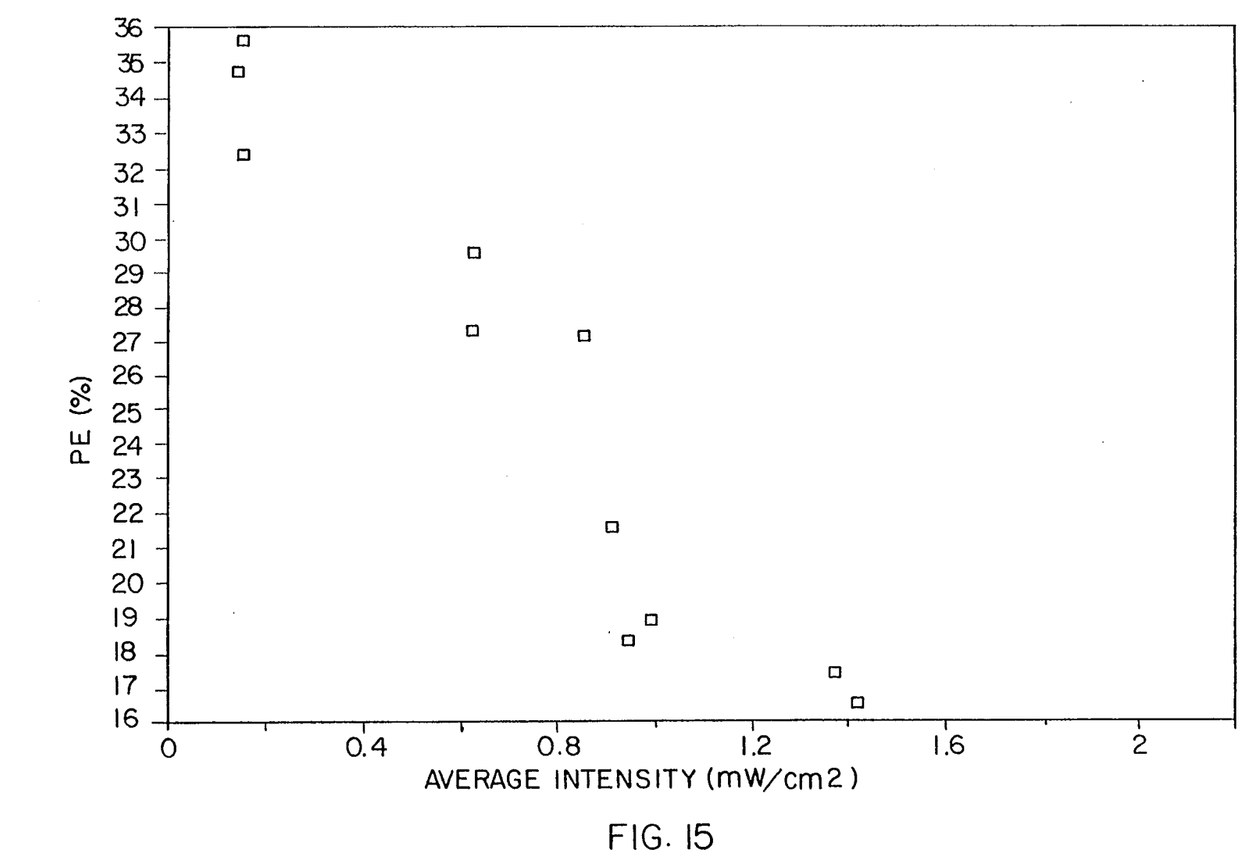
FIG. 15 illustrates the results of light intensity experiments using the channel reactor of FIG. 1 with illumination time and dark recovery times of 0.145 s and 1.20 s, respectively.

A continuous illumination experiment was performed at a very low light intensity of 0.135 mW/cm$^2$. Exposure was calculated such that approximately the same number of photons entered the reactor per unit time as in the 5×2 cm experiment of Example 2. The photoefficiency for the continuous experiment was 18%, virtually the same as that achieved in the 5×2 cm experiment, thus demonstrating that a particle can only efficiently convert a small number of photons at one time. They may either be delivered continuously or in intervals, providing the dose of photons per illumination is not too large and that there is a sufficiently dark recovery time between the periodic illuminations. Of further interest is the observation that a combination of periodic illumination and lower light intensity (intensity of 0.17 mW/cm$^2$ in FIG. 15) increases the photoefficiency more than either of the two options individually (34% versus 18%).

TABLE I

RESULTS FOR THE OXIDATION OF FORMATE IN THE CHANNEL PHOTOREACTOR.

| RUN | LENGTH(S) ILLUMINATED (# × width, cm) | LENGTH(S) DARK (# × width, cm) | $t_{light}$ (sec) | $t_{dark}$ (sec) | AVERAGE INTENSITY (mW/cm$^2$) | RATE OF PHOTONS ABSORBED (Ein/min) | RATE OF CO$_2$ PRODUCED (MOL/MIN) | PHOTO EFFICIENCY (%) |
|---|---|---|---|---|---|---|---|---|
| 1 | 1 × 80 | 0 | 5.80 | 0 | 2.03 | $2.0 \times 10^{-4}$ | $7.83 \times 10^{-6}$ | 4 |
| 2 | 11 × 2 | 10 × 6.4 | 0.145 | 0.462 | 1.68 | $4.5 \times 10^{-5}$ | $3.79 \times 10^{-6}$ | 8 |
| 3 | 7 × 2 | 6 × 12.7 | 0.145 | 0.923 | 1.63 | $2.8 \times 10^{-5}$ | $4.00 \times 10^{-6}$ | 14 |
| 4 | 6 × 2 | 5 × 15.2 | 0.145 | 1.10 | 1.54 | $2.3 \times 10^{-5}$ | $3.45 \times 10^{-6}$ | 15 |
| 5 | 5 × 2 | 4 × 20 | 0.145 | 1.45 | 1.44 | $1.8 \times 10^{-5}$ | $2.95 \times 10^{-6}$ | 17 |
| 6 | 3 × 2 | 2 × 41.5 | 0.145 | 3.01 | 1.45 | $1.1 \times 10^{-5}$ | $1.71 \times 10^{-6}$ | 16 |
| 7 | 1 × 20 | 0 | 1.45 | 0 | 1.45 | $4.2 \times 10^{-5}$ | $4.85 \times 10^{-6}$ | 12 |
| 8 | 3 × 10 | 2 × 20 | 0.724 | 1.45 | 1.70 | $5.6 \times 10^{-5}$ | $7.21 \times 10^{-6}$ | 13 |
| 9 | 4 × 5 | 3 × 20 | 0.363 | 1.45 | 1.52 | $3.8 \times 10^{-5}$ | $5.91 \times 10^{-6}$ | 16 |
| 10 | 5 × 2 | 4 × 20 | 0.145 | 1.45 | 1.44 | $1.8 \times 10^{-5}$ | $2.95 \times 10^{-6}$ | 17 |
| 11 | 4 × 1 | 3 × 20 | 0.072 | 1.45 | 1.54 | $7.4 \times 10^{-6}$ | $1.50 \times 10^{-6}$ | 20 |

Figure 14:
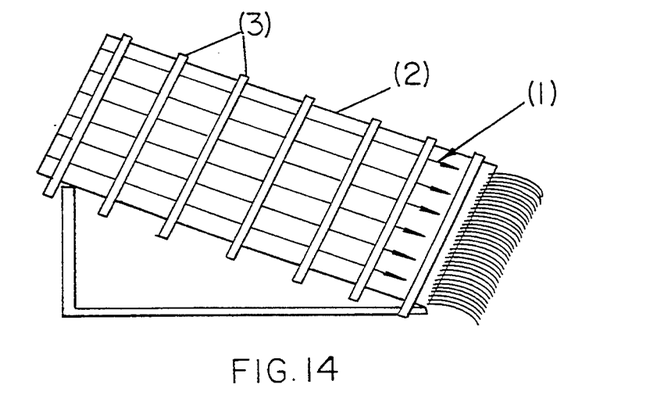
FIG. 14 illustrates an inclined plate photoreactor. Fluid flows over an inclined plate beneath UV light bulbs which are placed perpendicular to the axis of the flow.

In another embodiment of the photoreactor of the present invention, a thin film of photocatalytic slurry (1) flows down an inclined plate (2) (FIG. 14). The light bulbs (3) are placed over the plate perpendicular to the direction of flow. As the fluid flows down the plate, it receives a short pulse of light as it passes under each bulb. The illumination and dark recovery times are controlled by the velocity of the fluid and the distance between the bulbs. Modification to this design include furrowing or corrugations on the plate to generate rotating vortices in the fluid.

EXAMPLE 4

Effect of Light Intensity on Photoefficiency

Additional experiments were conducted with the channel reactor of Example 1 to determine the effect of light intensity on photoefficiency (PE). Variations in light intensity were caused by positioning the black light bulb at different heights above the channel. In these experiments, the illumination and dark recovery times were 0.145 s and 1.20 s, respectively. These illumination and recovery times were obtained by using six 2 cm exposure spacings separated by five 17 cm dark recovery spacings.

I claim:

1. A photocatalytic reactor wherein a slurry of photoreactive material is exposed to controlled periodic illumination comprising:
   (a) an irradiation chamber;
   (b) an illumination source;
   (c) means for periodically exposing the slurry of photoreactive material in the irradiation chamber to the source of illumination for a first select amount of time and preventing exposure of the slurry to the source of illumination for a second select amount of time; and
   (d) means for uniformly exposing the entire slurry of photoreactive material to the source of illumination.

2. The reactor of claim 1 wherein photoreactive material moves past at least one fixed source of illumination.

3. The reactor of claim 1 wherein at least one source of illumination moves past the photoreactive material.

4. The reactor of claim 1 wherein the photoreactive material is comprised of an aqueous slurry of a semiconductor powder, selected from the group consisting of titanium dioxide ($TiO_2$), tungsten oxide ($WO_3$) or strontium titanium oxide ($SrTiO_3$).

5. The reactor of claim 1 wherein the photoreactive material is comprised of an aqueous slurry of $TiO_2$.

6. The reactor of claim 1 wherein the source of illumination is selected from the group consisting of visible light, UV light or infrared light.

7. The reactor of claim 1 wherein the source of illumination is a UV light bulb.

8. A photocatalytic reactor wherein a slurry of photoreactive material is exposed to controlled periods of illumination, comprising:
 (a) a channel type irradiation chamber, comprising an inlet for carrying the photoreactive material into the irradiation chamber and an outlet for carrying the photoreactive material out of the irradiation chamber, and a conduit connecting the inlet with the outlet for circulating said fluid back into the photoreactor;
 (b) illuminating means for illuminating the irradiation chamber at fixed segments along the length of the irradiation chamber with unilluminated segments between the illuminated segments;
 (c) circulating means for producing flow of the slurry through the irradiation chamber at a select rate, said means being operatively associated with the irradiation chamber; and
 (d) distributing means for inducing substantially laminar flow of the slurry of photoreactive material as it passes through the irradiation chamber.

9. The reactor of claim 8 wherein the photoreactive material is comprised of a semiconductor powder selected from the group consisting of titanium dioxide ($TiO_2$), tungsten oxide ($WO_3$) or strontium titanium oxide ($SrTiO_3$).

10. The reactor of claim 8 wherein the photoreactive material is comprised of an aqueous slurry of $TiO_2$.

11. The reactor of claim 8 wherein said illuminating means is selected from the group consisting of visible light, UV light or infrared light.

12. The reactor of claim 8 wherein the means for illuminating the irradiation chamber is a UV light bulb.

13. The reactor of claim 8 wherein the means for producing flow of the aqueous slurry through the irradiation chamber is a pump in fluid communication with the conduit.

14. The photocatalytic reactor of claim 8 wherein the means for producing laminar flow is comprised of a fluid distributor and sluice gate positioned at the inlet of the irradiation chamber and a fluid collector positioned at the outlet of the irradiation chamber.

15. The photocatalytic reactor of claim 8 further comprising:
 (e) an ultrasonic bath located along the conduit, wherein said conduit passes through said ultrasonic bath.

16. A photocatalytic reactor wherein a slurry of photoreactive material is exposed to controlled periods of illumination, comprising:
 (a) a cylindrical helical tube irradiation chamber wherein the walls of said spherical tube are transparent to illumination, said spherical tube comprising an inlet for carrying the photoreactive material into the irradiation chamber and an outlet for carrying the photoreactive material out of the irradiation chamber;
 (b) an illumination source, said illumination source positioned along the length of the irradiation chamber to illuminate said chamber;
 (c) means for exposing only a select portion of said cylindrical tubing to the illumination source; and
 (d) means for inducing flow of the slurry of photoreactive material through the irradiation chamber at a selected rate, said means being operatively connected to the irradiation chamber.

17. The reactor of claim 16 wherein the photoreactive material is comprised of a semiconductor powder selected from the group consisting of titanium dioxide ($TiO_2$), tungsten oxide ($WO_3$) or strontium titanium oxide ($SrTiO_3$).

18. The reactor of claim 16 wherein the photoreactive material is comprised of $TiO_2$.

19. The reactor of claim 16 wherein the source of illumination is selected from the group consisting of visible light, UV light or infrared light.

20. The reactor of claim 16 wherein the source of illumination is a UV light bulb.

21. The reactor of claim 16 wherein a single source of illumination is used to continuously illuminate more than one irradiation chamber.

22. The reactor of claim 16 wherein the inner surface of the irradiation chamber is coated with photoreactive material.

23. A Taylor Vortex-type photocatalytic reactor wherein photoreactive material is exposed to controlled periods of illumination, comprising:
 (a) a Couette flow type irradiation chamber comprising, a first cylinder enclosing a shaft and a second cylinder enclosing the first cylinder, thereby forming a space between the first and second cylinders, wherein said first cylinder rotates relative to said second cylinder;
 (b) illuminating means for illuminating the irradiation chamber; and
 (c) rotating means for rotating the first cylinder at a selected rate, said rotating means being operatively associated with the irradiation chamber.

24. The photocatalytic reactor of claim 23, wherein photocatalytic material is placed in the space between the first and second cabinets.

25. The photocatalytic reactor of claim 23 wherein said illuminating means is positioned within the first cylinder.

26. The photocatalytic reactor of claim 23 wherein said illuminating means is positioned outside of the second cylinder.

27. The photocatalytic reactor of claim 23 wherein the first cylinder is rotated at a speed sufficient to induce couette flow of the photocatalytic material.

28. The reactor of claim 23 wherein the photoreactive material is comprised of a semiconductor powder, selected from the group consisting of titanium dioxide ($TiO_2$), tungsten oxide ($WO_3$) or strontium titanium oxide ($SrTiO_3$).

29. The reactor of claim 23 wherein the photoreactive material is comprised of an aqueous slurry of $TiO_2$.

30. The reactor of claim 23 wherein the illuminating means is selected from the group consisting of visible light, UV light or infrared light.

31. The reactor of claim 23 wherein the illuminating means is a UV light bulb.

32. A photocatalytic reactor wherein photoreactive material is exposed to controlled periods of illumination, comprising:
 (a) a channel trough irradiation chamber, said channel trough comprising an inlet for carrying the photoreactive material into the irradiation chamber and an outlet for carrying the photoreactive material out of the irradiation chamber;

(b) rows of hydrodynamic foils within the channel trough positioned to lie within the photoreactive material, perpendicular to the axis of the flow of the material through the channel trough, so as to generate a rotating vortex;

(c) at least one illumination source, positioned along the length of the irradiation chamber to illuminate at least one widthwise portion of the irradiation chamber; and (d) circulating means for producing flow of the slurry of photoreactive material through the irradiation chamber, said circulating means being operatively associated with the irradiation chamber.

33. The reactor of claim 32 wherein the photoreactive material is comprised of a semiconductor powder selected from the group consisting of titanium dioxide ($TiO_2$), tungsten oxide ($WO_3$) or strontium titanium oxide ($SrTiO_3$).

34. The reactor of claim 32 wherein the photoreactive material is comprised of an aqueous slurry of $TiO_2$.

35. The reactor of claim 32 wherein the source of illumination is selected from the group consisting of visible light, UV light or infrared light.

36. The reactor of claim 32 wherein the source of illumination is solar light.

37. A photocatalytic reactor wherein photoreactive material is exposed to controlled periods of illumination, comprising:

(a) a trough positioned at an incline to induce liquid flow in a lengthwise direction along the trough; and (b) at least one source of illumination, positioned to illuminate at least one widthwise segment along the length of the trough;

(c) means for periodically exposing a slurry of photoreactive material in the trough to the source of illumination for a first select amount of time and preventing exposure of the slurry to the source of illumination for a second select amount of time; and (d) means for uniformly exposing the entire slurry of photoreactive material to the source of illumination.

38. The photoreactor of claim 37, wherein the trough is furrowed or corrugated.

39. The photoreactor of claim 37 wherein the photoreactive material is comprised of a semiconductor powder selected from the group consisting of titanium dioxide ($TiO_2$), tungsten oxide ($WO_3$) or strontium titanium oxide ($SrTiO_3$).

40. The photoreactor of claim 37 wherein the photoreactive material is comprised of an aqueous slurry of $TiO_2$.

41. The photoreactor of claim 37 wherein the source of illumination is selected from the group consisting of visible light, UV light or infrared light.

42. The photoreactor of claim 37 wherein the source of illumination is a UV light bulb.

* * * * *